United States Patent
Rutz et al.

(10) Patent No.: US 6,508,524 B2
(45) Date of Patent: Jan. 21, 2003

(54) DRIVE SPROCKET WHEEL

(75) Inventors: Werner Rutz, Queidersbach (DE); Ingo Nöske, Zweibrücken (DE)

(73) Assignee: Demag Mobile Cranes GmbH & Co. KG, Munich (DE)

(*) Notice: Subject to any disclaimer, the term of this patent is extended or adjusted under 35 U.S.C. 154(b) by 9 days.

(21) Appl. No.: 09/864,052

(22) Filed: May 23, 2001

(65) Prior Publication Data

US 2001/0049313 A1 Dec. 6, 2001

(30) Foreign Application Priority Data

May 24, 2000 (DE) .......................................... 100 26 084

(51) Int. Cl.$^7$ .............................................. B62D 55/12
(52) U.S. Cl. ........................................ 305/195; 305/199
(58) Field of Search ................................ 305/195, 196, 305/197, 199; 474/901, 152, 153, 154, 155, 156, 199, 198, 166

(56) References Cited

U.S. PATENT DOCUMENTS

| | | | |
|---|---|---|---|
| 4,175,796 A | * 11/1979 | Boggs et al. | 305/115 |
| 4,332,573 A | * 6/1982 | Uchida et al. | 305/199 |
| 5,035,681 A | * 7/1991 | Hertel et al. | 210/251 |
| 5,161,867 A | * 11/1992 | Johnson | 305/137 |
| 5,636,911 A | * 6/1997 | Korpi | 305/193 |
| 6,371,874 B1 | * 4/2002 | Inoue | 474/156 |

FOREIGN PATENT DOCUMENTS

| | | | | |
|---|---|---|---|---|
| GB | 2086817 | * 11/1980 | | 305/193 |
| GB | 1602143 |   11/1981 | | |
| JP | 6033171 | *  2/1985 | | 305/199 |
| JP | 2293282 | *  2/1990 | | 305/193 |

* cited by examiner

Primary Examiner—S. Joseph Morano
Assistant Examiner—Long Bao Nguyen
(74) Attorney, Agent, or Firm—Cohen, Pontani, Lieberman & Pavane

(57) ABSTRACT

A drive sprocket for an endless chain on a track-type undercarriage includes a toothed wheel having a plurality of circumferential teeth extending from a root circle. A pair of mounting rings fixed to opposite axial sides of the wheel support a respective pair of rotating rings by means of bearings, each rotating ring forming a tread having a diameter which is small than the diameter of the root circle. The endless chain has a plurality of links connected end-to-end, each link having a pair of spaced apart guide webs extending in the direction of travel and connected by a cog which engages between two adjacent teeth on the toothed wheel, each guide web being profiled to ride on one of the treads.

16 Claims, 3 Drawing Sheets

DRIVE SPROCKET WHEEL

BACKGROUND OF THE INVENTION

1. Field of the Invention

The invention pertains to a drive sprocket wheel for a track-type undercarriage with several tread rollers and an endless chain, especially for cranes.

2. Description of the Related Art

A drive sprocket wheel of the general type in question is known from GB 1,602,143. This consists of a toothed wheel, provided with teeth around its circumference, and two treads, one on each side of the toothed wheel. As a result of the difference between the larger diameter of the root circle of the toothed wheel and the smaller outer diameter of the treads, a wheel flange is formed on each side; these flanges cooperate with the links of the endless chain. The endless chain consists of multiple links, each with a base plate; each link also has two guide webs, which are symmetric to the center and spaced a certain distance apart, extending in the travel direction. The webs have engaging surfaces which ride on opposed circumferential flanges of the sprocket wheel. A cog connects the two webs below the engaging surfaces and meshes with the teeth of the drive sprocket wheel. The pitch angle, obtained by dividing 360 degrees by the number of teeth, is constant around the entire circumference. The disadvantage of the known solution is that, when a crane is traveling downhill, it must be braked. Because the clearance is the same in all spaces between teeth of the toothed wheel, a shift in the relationship between the drive sprocket wheel and the endless chain thus occurs, with the result that the head area of the tooth affected by this shift runs up against the flank of the cog. In the least favorable case, the tooth shears off the flank of the cog, which leads to a further deterioration in the meshing conditions, which can become noticeable as loud noise. The problems just described can also occur when a change is made from forward to reverse travel.

SUMMARY OF THE INVENTION

The task of the invention is to improve a drive sprocket wheel of the general type in question so that the disadvantages described above are avoided.

In accordance with the principle of the invention, each tread has a stationary mounting ring connected to the toothed wheel, and a rotating ring is supported in bearings on the stationary mounting ring with the freedom to rotate. The bearings can be designed as plain bearings or as roller bearings. It is advantageous to install guide rings. For example, a guide ring of the type in question is offered by Busak+Shamban under the trade name "Luytex". The material is a composite textile material of finely woven synthetic fabric with added lubricants and is impregnated with special hot-setting polyester resins. The guide rings are cut at a slant and have the required gap dimension Z. To protect against dirt, seals are provided, one on the inside and one on the outside of the rotating rings. The stationary mounting ring preferably has on the outside a stop collar, against which the rotating ring can be supported axially. In this arrangement, it is necessary for the treads to be connected detachably to the toothed wheel, so that it is possible to install the rotating ring on the stationary mounting ring. As an alternative, it is also possible to connect the stop collar detachably to the stationary mounting ring, so that the stationary mounting ring can be an integral part of the toothed wheel.

The advantage of the design of the drive sprocket wheel proposed here is that the toothed wheel can rotate relative to the rotating rings, including the base plates. This means that the base plate is always oriented correctly to the drive sprocket wheel, and thus the danger that a tooth of the drive sprocket wheel will run up against the chain is reduced. Operating tests have shown that track-type undercarriages equipped in this manner operate more smoothly than track-type undercarriages according to the state of the art.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
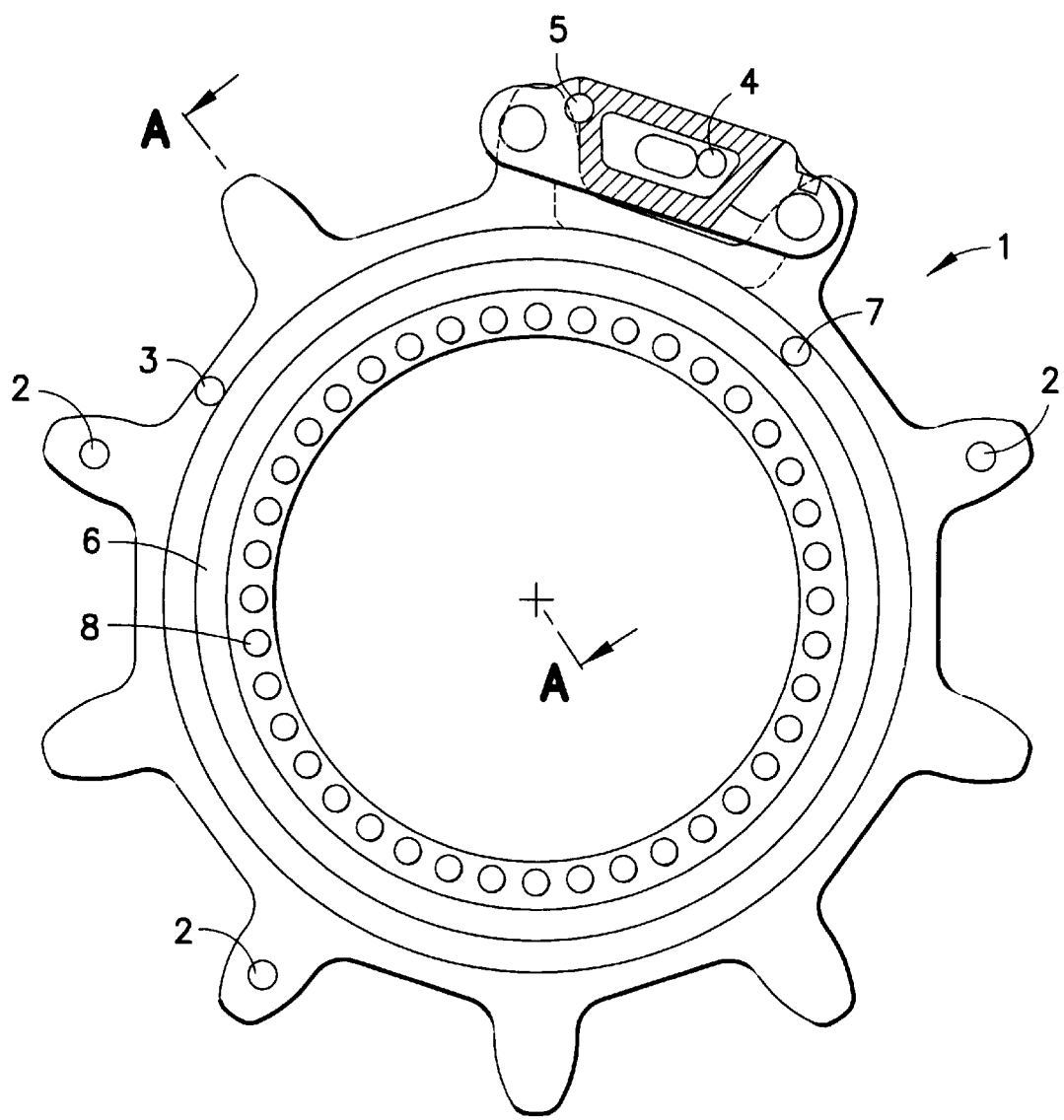
FIG. 1 shows a side view of a drive sprocket wheel designed in accordance with the invention.

FIG. 1 shows a drive sprocket wheel 1 according to the invention from the side. It includes of a toothed wheel 3 provided with chain teeth 2 and two treads, one on each side. The teeth 2 of the drive sprocket wheel 1 work together with an endless chain, only one link 4 of which is shown here. During this interaction, the cog 5 of the chain link 4 meshes with the teeth 2.

Figure 2:
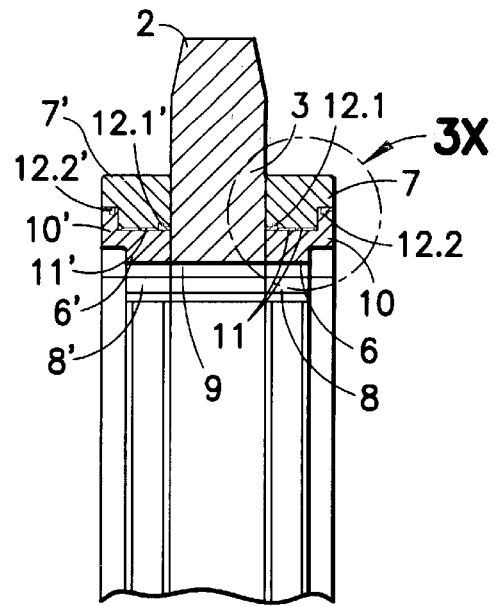
FIG. 2 shows a half-cross section along line A—A of FIG. 1.
Figure 3:
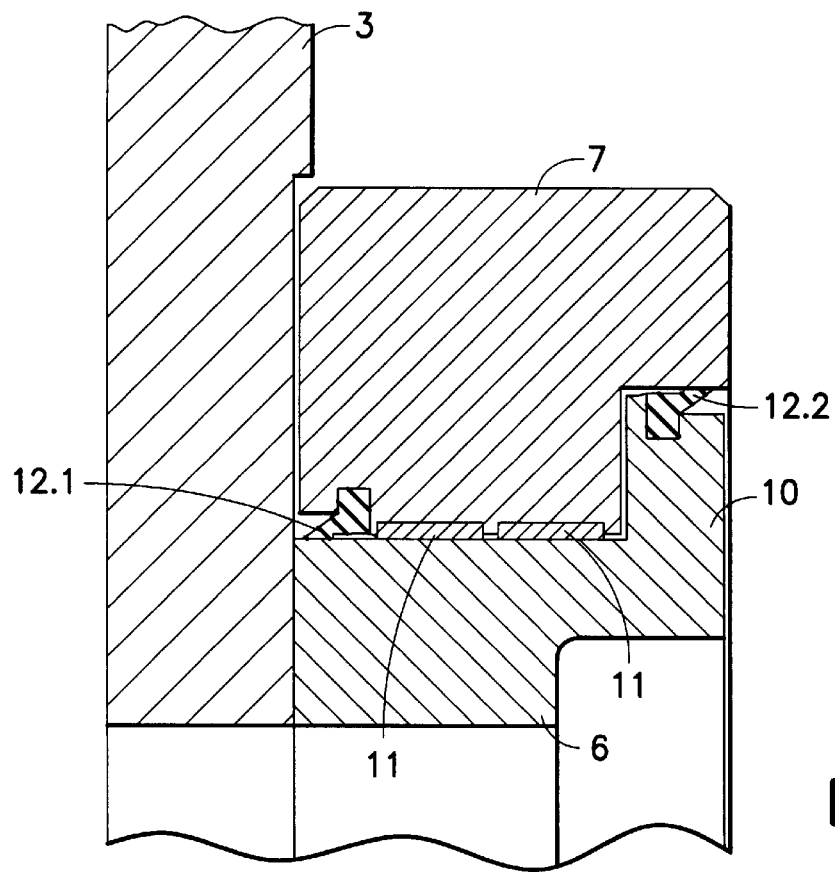
FIG. 3 shows the detail X in FIG. 2.

The details of the drive sprocket wheel are best seen in the views of FIGS. 2 and 3. According to the invention, each tread consists of a stationary mounting ring 6 and a rotating ring 7, which is supported with freedom of rotation on the stationary mounting ring. In this exemplary embodiment, the stationary mounting ring 6, 6' is connected detachably to the toothed wheel 3. Bores 8, 8', 9 are provided, which pass through the two stationary mounting rings 6, 6' and the toothed wheel 3; when properly aligned, a screw can be inserted through them. This detachability is necessary because of the stop collars 10, 10' on the stationary mounting rings 6, 6'; otherwise the rotating rings 7, 7' could not be installed. Because of the high surface loads, the rotating rings 7, 7' in this exemplary embodiment are supported by two guide rings 11, 11' which serve as sliding contact bearings. The guide rings 11, 11' are preferably made of a composite textile material and can be easily installed in a flat, ring-shaped groove in rotating ring 7, 7' by compressing the gap. Seals 12.1, 12.1', 12.2, 12.2' are provided on the inside and on the outside of the rotating ring 7, 7' so that no dirt can intrude into the area of the bearings.

Figure 4:
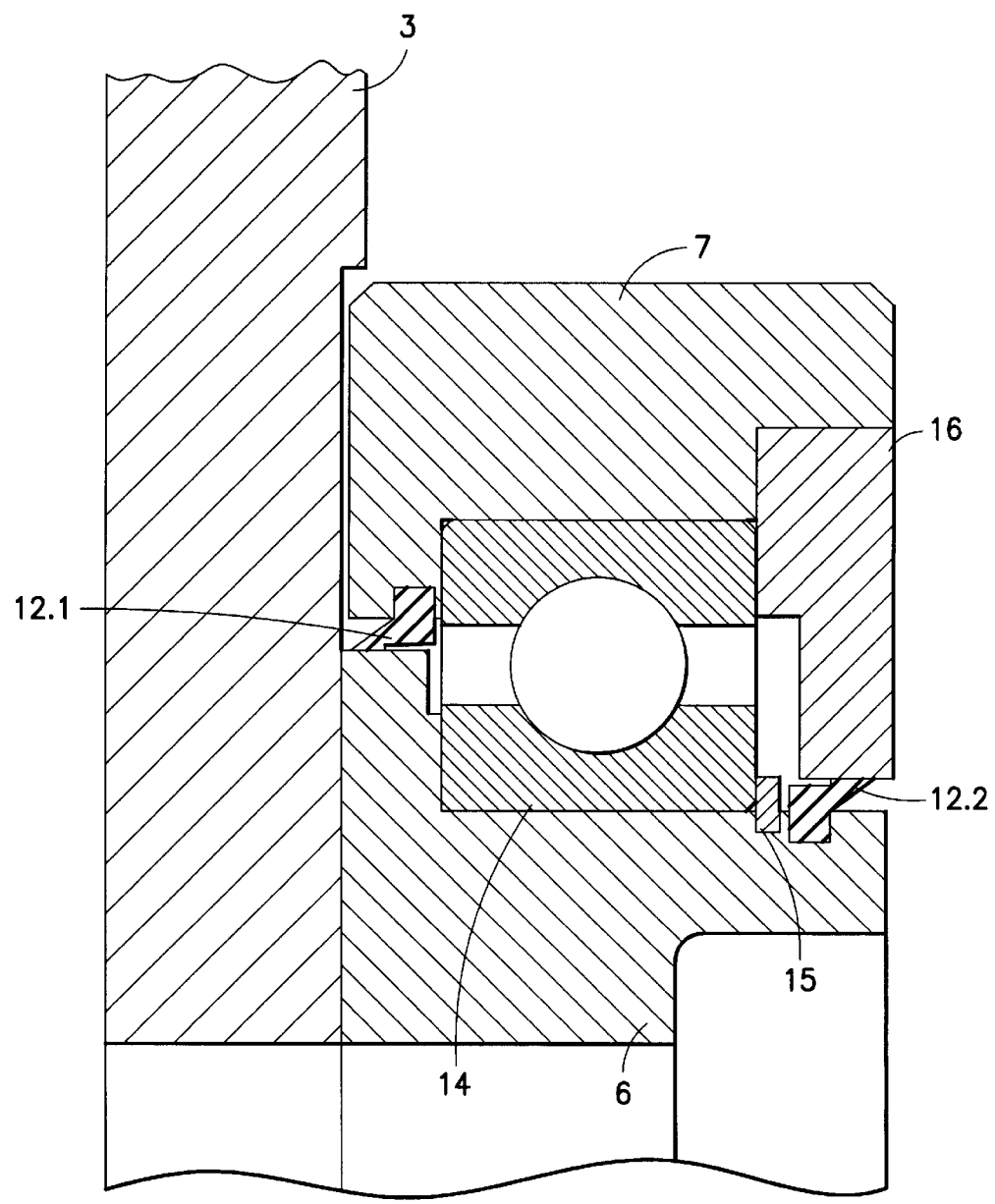
FIG. 4 shows the rotating ring supported on the mounting ring by a ball bearing.

FIG. 4 is a detail similar to FIG. 3 showing an alternative embodiment having a ball bearing 14 between the mounting ring 6 and the rotating ring 7. The bearing 14 has an inner race received against the mounting ring 6 and an outer race received against the rotating ring 7. The bearing is held in place by a stop collar 15 received in a groove in the mounting ring 6; the bearing is protected by a cover 16 which is bolted to the rotating ring 7, and seals 12.1, 12.2. To change the bearing, it is first necessary to remove the cover 16, stop collar 15, and seal 12.2, whereupon the rotating ring 7 and bearing 14 can be removed as a unit. Since it is not necessary to remove the mounting rings 6 from the toothed wheel 3, it is also possible to form the mounting rings 6 integrally with the toothed wheel. Also, instead of the ball bearing as shown, the bearing 14 could be a roller bearing or a needle bearing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive sprocket wheel for an endless chain on a track-type undercarriage, said drive sprocket comprising
    a toothed wheel having a circumference and chain teeth provided about said circumference, said teeth defining a root circle of said toothed wheel,
    a pair of mounting rings extending from opposite axial sides of said toothed wheel, each said mounting ring being fixed with respect to said wheel, and
    a pair of rotating rings supported on respective said mounting rings, each said rotating ring being rotatable with respect to said toothed wheel, each said rotating ring forming a tread having a diameter which is smaller than the diameter of the root circle.

2. A drive sprocket wheel as in claim 1 wherein each said rotating ring is supported on said mounting ring by means of a bearing.

3. A drive sprocket wheel as in claim 2 wherein each said bearing is a sliding bearing.

4. A drive sprocket wheel as in claim 3 wherein each said sliding bearing comprises a pair of axially spaced guide rings.

5. A drive sprocket wheel as in claim 2 wherein each said bearing is a ball bearing.

6. A drive sprocket wheel as in claim 2 further comprising a pair of seals located between each said mounting ring and each said rotating ring, one said seal being located on each axial side of each said bearing.

7. A drive sprocket wheel as in claim 1 wherein said mounting rings are connected detachably to said toothed wheel.

8. A drive sprocket wheel as in claim 7 wherein each said mounting ring comprises a stop collar which holds said rotating ring in place axially with respect to said toothed wheel.

9. A track-type undercarriage comprising
    a drive sprocket wheel comprising a toothed wheel having a circumference and chain teeth provided about said circumference, said teeth defining a root circle of said toothed wheel,
    a pair of mounting rings extending from opposite axial sides of said toothed wheel, each said mounting ring being fixed with respect to said wheel, and a pair of rotating rings supported on respective said mounting rings, each said rotating ring being rotatable with respect to said toothed wheel, each said rotating ring forming a tread having a diameter which is smaller than the diameter of the root circle, and
    an endless chain comprising a plurality of links connected end-to-end in a direction of travel, each said link comprising a pair of spaced apart guide webs extending in said direction of travel and connected by a cog which engages between two adjacent said teeth on said toothed wheel, each said guide web being profiled to ride on a respective said tread.

10. A track-type undercarriage as in claim 9 wherein each said rotating ring is supported on said mounting ring by means of a bearing.

11. A track-type undercarriage as in claim 10 wherein each said bearing is a sliding bearing.

12. A track-type undercarriage as in claim 11 wherein each said sliding bearing comprises a pair of axially spaced guide rings.

13. A track-type undercarriage as in claim 10 wherein each said bearing is a ball bearing.

14. A track-type undercarriage as in claim 10 further comprising a pair of seals located between each said mounting ring and each said rotating ring, one said seal being located on each axial side of each said bearing.

15. A track-type undercarriage as in claim 9 wherein said mounting rings are connected detachably to said toothed wheel.

16. A track-type undercarriage as in claim 15 wherein each said mounting ring comprises a stop collar which holds said rotating ring in place axially with respect to said toothed wheel.

* * * * *